(12) United States Patent
Ishikawa et al.

(10) Patent No.: US 7,562,434 B2
(45) Date of Patent: Jul. 21, 2009

(54) METHOD OF ASSEMBLING A CARRIAGE ASSEMBLY

(75) Inventors: Naoki Ishikawa, Kawasaki (JP); Hidehiko Kira, Kawasaki (JP); Hiroshi Kobayashi, Kawasaki (JP); Takayoshi Matsumura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 405 days.

(21) Appl. No.: 11/442,935

(22) Filed: May 30, 2006

(65) Prior Publication Data

US 2007/0186410 A1    Aug. 16, 2007

(30) Foreign Application Priority Data

Feb. 13, 2006   (JP) ............... 2006-035307

(51) Int. Cl.
*G11B 5/127* (2006.01)
*H04R 31/00* (2006.01)

(52) U.S. Cl. ............... 29/603.03; 29/603.04; 29/603.06; 29/603.07; 360/265.6; 360/266.1; 360/264.1

(58) Field of Classification Search ............... 29/603.03, 29/603.04, 603.06, 603.07; 360/265.6, 266.1, 360/264.1, 345.2
See application file for complete search history.

(56) References Cited

U.S. PATENT DOCUMENTS

| | | | | |
|---|---|---|---|---|
| 5,153,794 A | * | 10/1992 | Hinlein ............... | 360/244.6 |
| 5,185,683 A | * | 2/1993 | Oberg et al. ............... | 360/244.6 |
| 5,444,587 A | * | 8/1995 | Johnson et al. ............... | 360/245.2 |
| 5,602,698 A | * | 2/1997 | Miyazaki et al. ............... | 360/244.6 |
| 5,796,555 A | * | 8/1998 | Aoyagi et al. ............... | 360/244.6 |
| 6,289,577 B1 | * | 9/2001 | Tanaka et al. ............... | 29/603.03 |
| 6,389,684 B1 | * | 5/2002 | Toensing et al. ............... | 29/757 |
| 6,424,497 B1 | * | 7/2002 | Coon ............... | 360/244.6 |
| 6,704,995 B2 | * | 3/2004 | Toensing et al. ............... | 29/603.03 |

FOREIGN PATENT DOCUMENTS

| | | |
|---|---|---|
| JP | 09-007324 | 1/1997 |
| JP | 2004-127491 | 4/2004 |

* cited by examiner

*Primary Examiner*—Paul D Kim
(74) *Attorney, Agent, or Firm*—Greer, Burns & Crain, Ltd.

(57) ABSTRACT

When crimping suspensions to carriage arms using a metal ball by applying ultrasonic vibration to a crimping tool, the suspensions can be crimped to the carriage arms without causing deformation to the suspensions and the like. A method of assembling a carriage assembly aligns attachment holes provided in front ends of carriage arms and crimping portions provided on suspensions to set the suspensions on the carriage arms and then presses a ball through crimping holes provided in the crimping portions while applying ultrasonic vibration to the crimping tool to crimp the suspensions to the carriage arms. When doing so, a ball, such as a ball whose surface has been subjected to a dimpling process, for which a load that acts on the ball when the ball passes through the crimping holes is low compared to a spherical ball is used to crimp the suspensions to the carriage arms.

3 Claims, 4 Drawing Sheets

METHOD OF ASSEMBLING A CARRIAGE ASSEMBLY

BACKGROUND OF THE INVENTION

1. Field of the Invention

The present invention relates to a method of assembling a carriage assembly for use in a magnetic disk apparatus, and in more detail to a method of assembling a carriage assembly assembled by crimping together carriage arms and suspensions.

2. Related Art

FIG. 8 schematically shows the overall construction of a carriage assembly used in a magnetic disk apparatus. The carriage assembly is formed by attaching suspensions 12 to the front ends of carriage arms 10, a plurality of which are disposed in parallel in accordance with the intervals at which magnetic media are disposed. A slider 14 equipped with a magnetic head used to record and reproduce information is mounted on the front end of each suspension 12. A flexible circuit board 16 is attached to side surfaces of the carriage arms 10, and the magnetic heads formed on the sliders 14 and a control unit 18 are electrically connected via the flexible circuit board 16.

FIGS. 9A and 9B show a conventional method of fixing (attaching) the suspensions 12 to the carriage arms 10. After the suspensions 12 have been set on the carriage arms 10 by aligning crimping portions 12a formed at base portions of the suspensions 12 with attachment holes 10a formed in the front ends of the carriage arms 10, a ball 20 made of metal and formed with a slightly larger diameter than an inner diameter of crimping holes 12b provided in the crimping portions 12a is pressed into the crimping holes 12b and is passed through the crimping holes 12b to fix the suspensions 12 to the carriage arms 10. Since the pressure/heat applying head 20 is formed with a slightly larger diameter than the crimping holes 12b, when the metal ball 20 passes through the crimping holes 12b, the crimping portions 12a are pressed open to fix the suspensions 12 to the carriage arms 10 by crimping.

Since deformation occurs due to the crimping when the ball 20 is pressed into the crimping holes 12b, ultrasonic vibration is conventionally applied to the crimping tool 22 to reduce the stress when the ball 20 is pressed into the crimping holes 12b, thereby reducing deformation of the suspensions 12 and the like.

It is believed that deformation of the suspensions 12 and the like can be reduced by applying ultrasonic vibration to the crimping tool when crimping the suspensions 12 to the carriage arms 10 using the ball 20 since the ultrasonic vibration causes the ball 20 to rotate when the ball passes through the crimping holes 12b, thereby reducing the load on the ball 20. Accordingly, when the ball 20 is pressed into the crimping holes while applying ultrasonic vibration to the crimping tool 22, it is possible to suppress the deformation caused by the crimping by preventing the rotation of the ball 20 from being obstructed.

Patent Document 1

Japanese Laid-Open Patent Publication No. 2004-127491

As magnetic disk apparatuses have become smaller, the carriage assemblies provided in magnetic disk apparatuses have been miniaturized, the suspensions mounted on the carriage assemblies have been miniaturized, and the thicknesses of the members have been reduced. Accordingly, when the suspensions are crimped onto the carriage arms, the suspensions 12 are susceptible to deforming when the crimping force becomes only slightly uneven.

SUMMARY OF THE INVENTION

It is an object of the present invention to provide a method of assembling a carriage assembly which when crimping suspensions to carriage arms by using a ball and applying ultrasonic vibration to a crimping tool can crimp the suspensions to the carriage arms more reliably without causing deformation of the suspensions and the like.

To achieve the stated object, a method of assembling a carriage assembly according to the present invention aligns attachment holes of carriage arms and crimping portions provided on suspensions to set the suspensions on the carriage arms and then applies ultrasonic vibration to a crimping tool and presses a ball through crimping holes provided in the crimping portions to crimp the suspensions to the carriage arms, wherein the suspensions are crimped to the carriage arms using a ball for which a load that acts when the ball passes through the crimping holes is lower than a load that acts on a spherical ball.

As methods of reducing the load that acts on the ball, it is effective to use a method that uses a ball for which the contact area with the crimping holes is reduced compared to a spherical ball, such as a ball in whose external surface a concave portion or a convex portion is formed, a method that uses a ball whose surface is covered with a layer of lubricating material, and a method that uses a ball whose center of gravity is displaced from a center of symmetry of an external shape of the ball.

Another method of assembling a carriage assembly according to the present invention aligns attachment holes of carriage arms and crimping portions provided on suspensions to set the suspensions on the carriage arms and then applies ultrasonic vibration to a crimping tool and presses a ball through crimping holes provided in the crimping portions to crimp the suspensions to the carriage arms, wherein suspensions where inner circumferential surfaces of the crimping holes of the crimping portions have been subjected to a groove-forming process are used and the suspensions are crimped to the carriage arms by pressing the ball into the crimping holes using the crimping tool.

Yet another method of assembling a carriage assembly according to the present invention aligns attachment holes of carriage arms and crimping portions provided on suspensions to set the suspensions on the carriage arms and then applies ultrasonic vibration to a crimping tool and presses a ball through crimping holes provided in the crimping portions to crimp the suspensions to the carriage arms, wherein the carriage arms and the crimping tool are relatively rotated about an axis of the crimping tool when the ball is pressed into the crimping holes to crimp the suspensions to the carriage arms. Here, the expression "the carriage arms and the crimping tool are relatively rotated" refers to a method where one of the carriage arms and the crimping tool is fixed and the other is rotated and a method where both the carriage arms and the crimping tool are rotated in opposite directions or in the same direction (at rotational speeds that result in relative rotation).

It should be noted that the method of crimping members by pressing a ball into crimping holes is not limited to the crimping of suspensions to carriage arms, and can be generally used as a method of crimping two members together. That is, in a method of manufacturing a member by pressing a ball into holes provided in first members to crimp together the first members and second members, it is possible to manufacture the member by crimping together the first members and the second members using a ball in whose surface a convex portion and/or a concave portion is formed, a non-spherical ball, a ball whose surface is covered with a lubricating material layer, or a ball whose center of gravity is displaced from a center of symmetry of an external shape thereof.

According to the method of assembling a carriage assembly according to the present invention, it is possible to reduce the load that acts on the ball when the ball is pressed into the crimping holes compared to the case where a spherical ball is used, and therefore it is possible to crimp the suspensions to the carriage arms while suppressing deformation of the suspensions and the carriage arms.

BRIEF DESCRIPTION OF THE DRAWINGS

The aforementioned and other objects and advantages of the present invention will become apparent to those skilled in the art upon reading and understanding the following detailed description with reference to the accompanying drawings.

In the drawings.

DESCRIPTION OF THE PREFERRED EMBODIMENTS

Preferred embodiments of the present invention will now be described in detail with reference to the attached drawings.

Method of Assembling a Carriage Assembly

Figure 1:
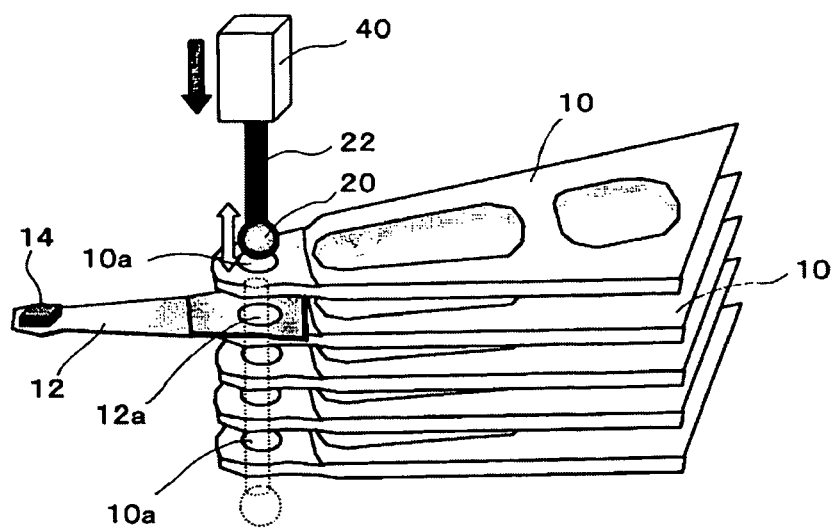
FIG. 1 is a diagram useful in explaining a method of assembling a carriage assembly.

FIG. 1 is a diagram useful in explaining one embodiment of a method of assembling a carriage assembly according to the present invention. The method of assembling the carriage assembly according to the present embodiment crimps the suspensions 12 to the carriage arms 10 using the ball 20 described above. FIG. 1 shows a state where a suspension 12 is crimped to the carriage arms 10 by pressing the metal ball 20 into a crimping portion using the crimping tool 22 that is an ultrasonic horn provided in an ultrasound generating apparatus 40.

Figure 9A:
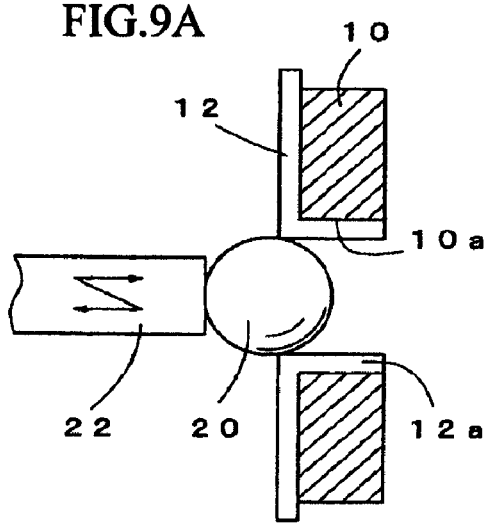
FIGS. 9A and 9B are diagrams useful in explaining a method of assembling a carriage assembly using a ball.
Figure 9B:
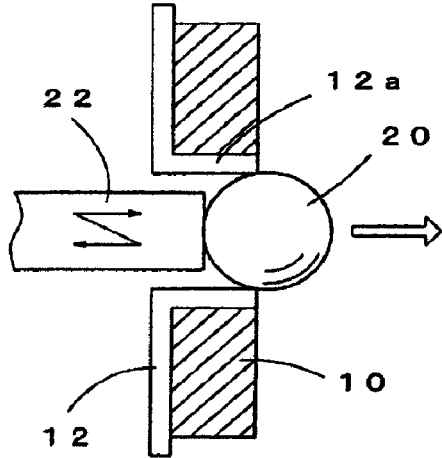

Note that attaching holes 10a are formed at the front ends of the carriage arms 10 and the crimping portions 12a formed in the base portions of the suspensions 12 are inserted into the attaching holes 10a to set the suspensions 12 on the carriage arms 10. As shown in FIGS. 9A and 9B, the crimping portions 12a of the suspensions 12 are formed as short cylinders and the suspensions 12 are set on the carriage arms 10 by fitting the crimping portions 12a into the attaching holes 10a.

The metal ball 20 is formed with a slightly larger diameter than the inner diameter of crimping holes 12b of the crimping portions 12a formed on the suspensions 12, and after the metal ball 20 has been set on the crimping holes 12b, the metal ball 20 is pressed from above while applying ultrasonic vibration to the crimping tool 22 to pass the metal ball 20 through the crimping holes 12b. By passing the metal ball 20 through the crimping holes 12b, the crimping portions 12a are crimped to the carriage arms 10 in the same way as in the conventional art described above.

Note that although a state where a suspension 12 is set on one carriage arm 10 is shown in FIG. 1 for ease of explanation, in reality suspensions 12 are set on every carriage arm 10 and then the ball 20 is pushed downward from the uppermost carriage arm 10 using the crimping tool 22 to successively strike and crimp the suspensions 12 to all of the carriage arms 10.

First Embodiment

Figure 2A:
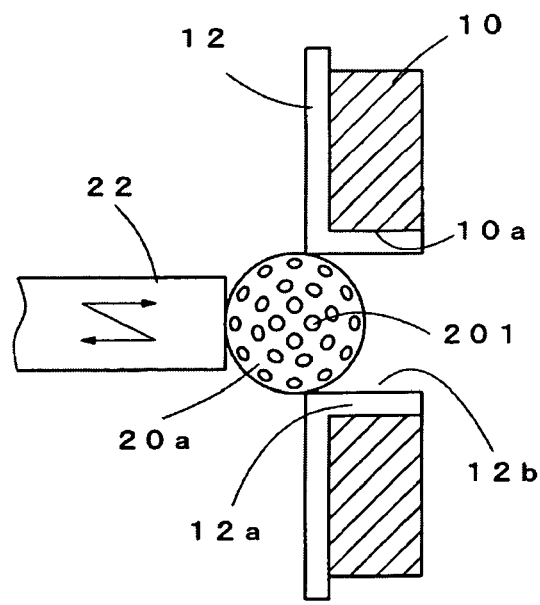
FIGS. 2A and 2B are diagrams useful in explaining a first embodiment of a method of assembling a carriage assembly.
Figure 2B:
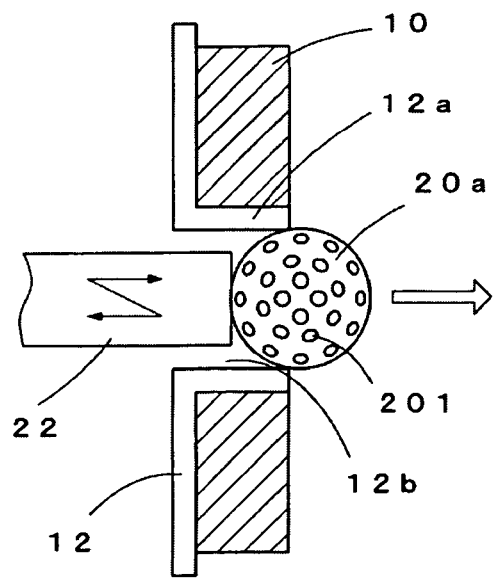

FIGS. 2A and 2B show how a ball 20a in whose outer surface dimples (concaves) 201 are formed is used as the ball 20 that is pressed by the crimping tool 22 into the crimping holes of the suspensions 12 to crimp the suspensions 12 to the carriage arms 10.

FIG. 2A shows a state where a suspension 12 is set on the front end of a carriage arm 10, the ball 20a is set on the crimping hole 12b formed in the crimping portion 12a of the suspension 12, and the ball 20a is pressed in using the crimping tool 22.

FIG. 2B shows a state where the ball 20a has passed through the crimping hole 12b while ultrasonic vibration is being applied to the crimping tool 22.

The ball 20 that is conventionally used is formed as a perfect sphere with a diameter that is slightly larger than the inner diameter of the crimping hole 12b. If a ball 20a whose outer surface has been subjected to a dimpling process is used like in the present embodiment, compared to when a spherical ball is used, it is possible to reduce the contact area between the ball 20a and the inner surface of the crimping hole 12b when the ball 20a passes through the crimping hole 12b. This means that when ultrasonic vibration acts on the ball 20a, it becomes easy for the ball 20a to rotate, the load when the ball 20a passes through a crimping hole 12b is reduced, and therefore it becomes possible to suppress deformation of the suspensions 12 and the like when the suspensions 12 are crimped to the carriage arms 10. Note that a method where the contact area between the ball and the crimping holes 12b is reduced compared to a spherical ball is not limited to a method where the outer surface of the ball is subjected to a dimpling process and it is possible to use a method where the outer surface of the ball is formed as a roughened surface.

Figure 3A:
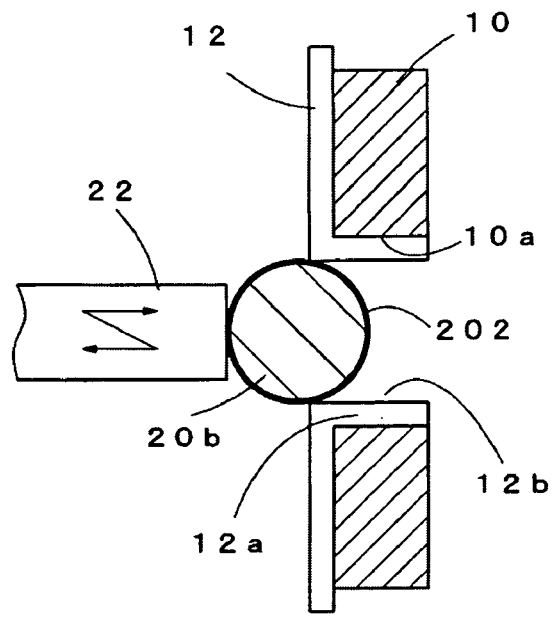
FIGS. 3A and 3B are diagrams useful in explaining another example of the first embodiment.
Figure 3B:
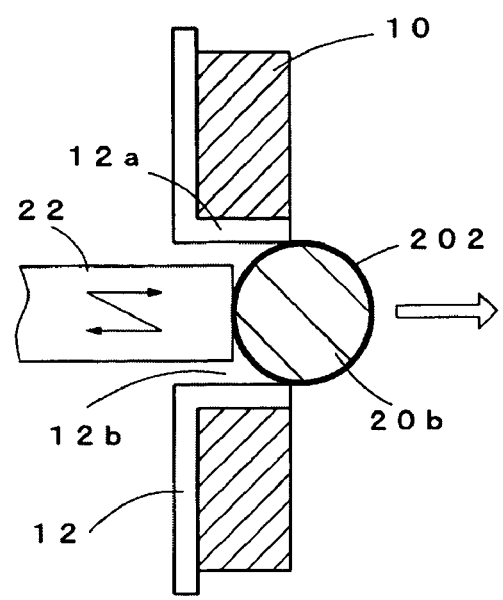

During crimping, as another method of reducing the load when the ball passes through the crimping holes 12b, as shown in FIG. 3, there is a method that uses a ball 20b where a lubricating material layer is provided on the surface of the ball. FIG. 3A shows a state where the ball 20b is set on a crimping hole 12b and ultrasonic vibration is applied to the crimping tool 22 to start a pressing operation, and FIG. 3B shows a state where the ball 20b has been pressed into and through the crimping hole 12b to crimp the suspension 12 to the carriage arm 10.

As shown in the present embodiment, even when the ball 20b that has a lubricating material layer 202 is formed on the surface is used, it is possible to reduce the load when the ball 20b passes through the crimping holes 12b, and therefore it is possible to suppress deformation and the like of the suspensions 12 when the suspensions 12 are crimped to the carriage arms 10. Note that as the method of providing the lubricating material layer 202 on the surface of the ball, it is possible to use a method where lubricant such as oil is applied to the surface of the ball or a method where the surface of the ball is covered using a resin with superior lubricating characteristics.

Second Embodiment

Figure 4A:
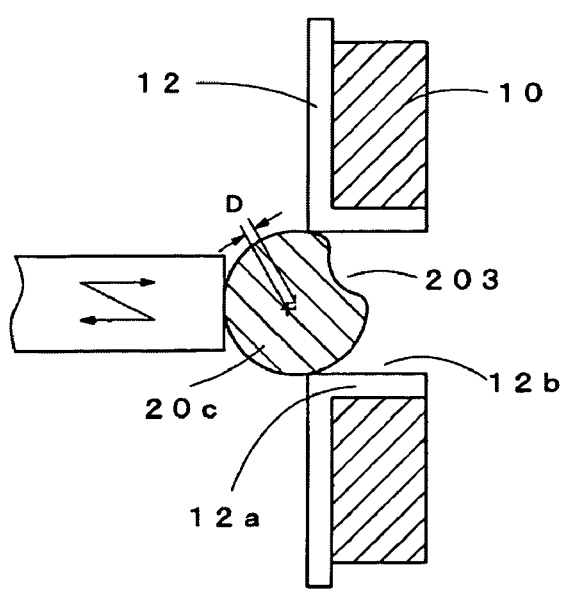
FIGS. 4A and 4B are diagrams useful in explaining a second embodiment of a method of assembling a carriage assembly.
Figure 4B:
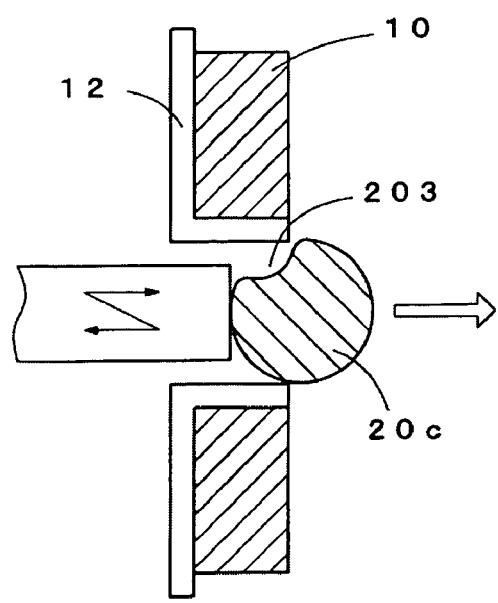

When the ball is pressed into and passed through the crimping holes 12b of the suspensions 12 using the crimping tool 22, as shown in FIG. 4, a method that uses a ball 20c formed so that a center of gravity of the ball is displaced from a center of symmetry of the external shape of the ball may be used as a method of facilitating rotation of the ball as the ball passes through the crimping holes 12b.

The ball 20c shown in FIG. 4A has a concave 203 formed in part of the outer surface of the ball so that the center of gravity of the ball 20c is displaced (the displacement D) with respect to the center of rotation when the ball 20c rotates.

In this way, if the ball is deformed from a spherical shape to shift the center of gravity, when ultrasonic vibration is applied to the crimping tool 22 to press the ball 20c into the crimping hole 12b, the vibration that is transmitted from the crimping tool 22 to the ball 20c makes the ball 20c susceptible to rocking and rolling, and therefore it is possible to reduce the load when the ball 20c passes through the crimping holes 12b.

As examples of a ball that is deformed from a spherical shape, it is possible to use a ball produced in an oval shape, a rugby ball shape, or a conical shape. In addition, to shift the center of gravity of the ball, it is possible to use methods aside from deforming the ball from a spherical shape, such as providing a protrusion on the outer surface of the ball.

Third Embodiment

Figure 5A:
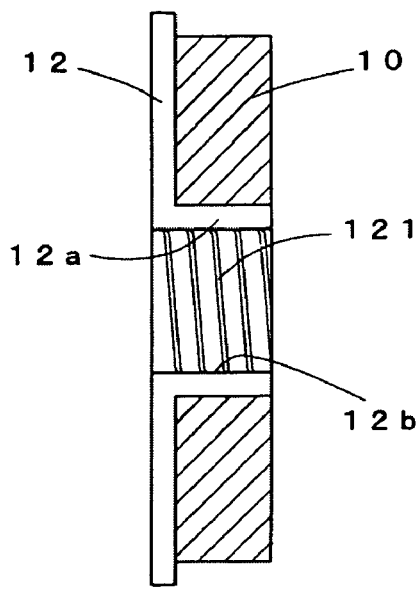
FIGS. 5A and 5B are diagrams useful in explaining a third embodiment of a method of assembling a carriage assembly.
Figure 5B:
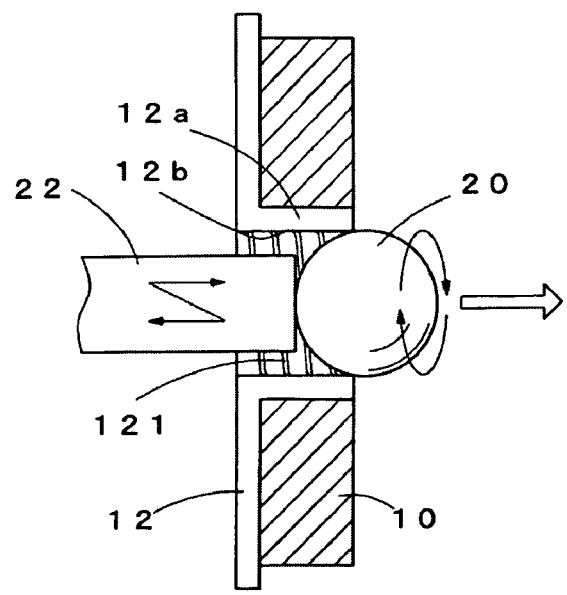

FIGS. 5A and 5B show a method that forms screw threads 121 in inner surfaces of the crimping holes 12b of the crimping portions 12a of the suspensions 12 as one example of a method of causing a ball to rotate when the ball is pressed into the crimping holes 12b by the crimping tool 22.

FIG. 5A shows a state where a screw thread 121 is provided in an inner circumferential surface of the crimping hole 12b of a suspension 12. FIG. 5B shows a state where the ball is pressed into and passed through the crimping hole 12b by the crimping tool 22. When ultrasonic vibration is applied to the crimping tool 22 to cause the ball 20 to advance through the crimping hole 12b, the action of the screw thread 121 causes the ball 20 to rotate about the axis while moving through the crimping hole 12b.

In this way, by carrying out a process that causes a rotational force to act on the ball 20 due to the action of the screw thread 121 or the like formed in the inner circumferential surface of the crimping hole 12b through which the ball 20 passes, in addition to reducing the load that acts on the ball 20 by applying the ultrasonic vibration, it is possible to further reduce the load that acts on the crimping portion due to the ball 20 being actively rotated, thereby suppressing deformation due to the crimping.

Note that a groove-forming process carried out on the inner circumferential surfaces of the crimping holes 12b is not limited to forming screw threads and any grooves that apply a rotational force to the ball 20 due to the pressing force when the ball 20 is pressed into the crimping holes 12b may be formed.

The present embodiment has an advantage in that the stress that acts on the ball 20 can be reduced even when a spherical ball is used in the same way as in the conventional art.

Fourth Embodiment

Figure 6A:
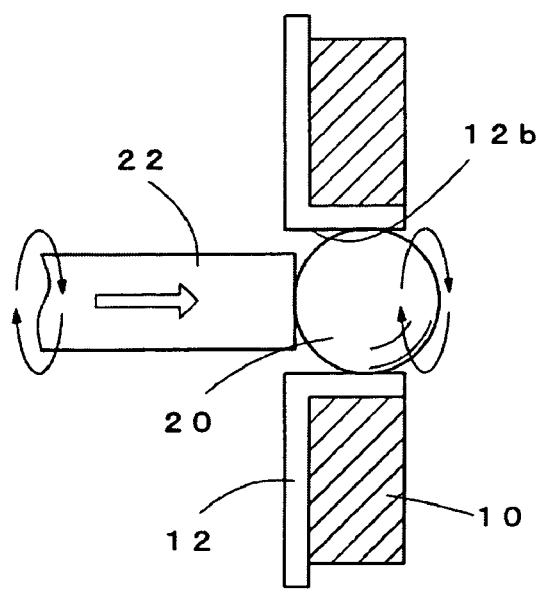
FIGS. 6A and 6B are diagrams useful in explaining a fourth embodiment of a method of assembling a carriage assembly.
Figure 6B:
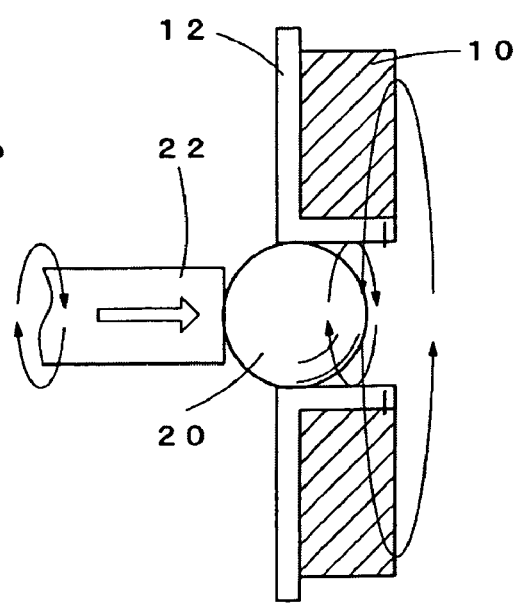

FIGS. 6A and 6B show a modification of apparatuses that support the crimping tool 22 and the carriage arm 10 as a method of actively causing a rotational force to act on the ball 20.

FIG. 6A shows an example where the crimping tool 22 is rotated around an axis thereof so that when the ball 20 is pressed into the crimping hole 12b using the crimping tool 22, the friction between the crimping tool 22 and the ball 20 causes the ball 20 to rotate as the ball 20 moves inside the crimping hole 12b. Here, in addition to the conventional force applied from the crimping tool 22 to the ball 20 to cause the ball 20 to rotate forwards, a force that causes the ball 20 to rotate about the axis of the crimping tool 22 is applied. By doing so, it is possible to reduce the load (stress) when the ball 20 passes through the crimping hole 12b.

FIG. 6B shows an example where the crimping tool 22 is rotated around an axis thereof and a support structure that supports the carriage arm 10 is simultaneously rotated around the axis of the crimping tool 22. By rotating the carriage arm 10 in the opposite direction to the direction of rotation of the crimping tool 22, it is possible to relatively increase the rotational force that acts on the ball 20, which makes it possible to further reduce the load when the ball 20 passes through the crimping hole 12b. Note that it is also possible to rotate only the support structure of the carriage arm 10 without rotating the crimping tool 22.

Fifth Embodiment

Figure 7A:
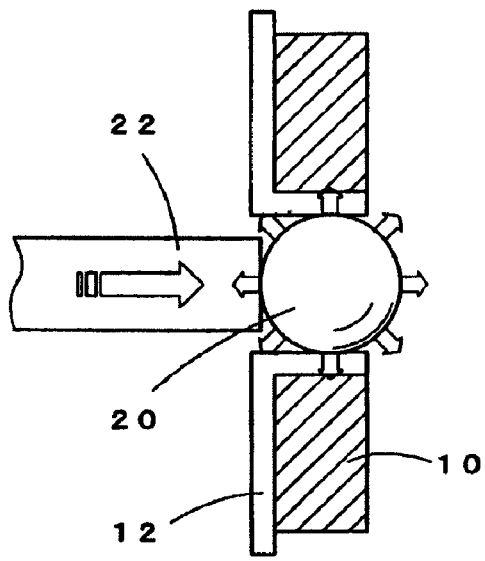
FIGS. 7A and 7B are diagrams useful in explaining a fifth embodiment of a method of assembling a carriage assembly.
Figure 7B:
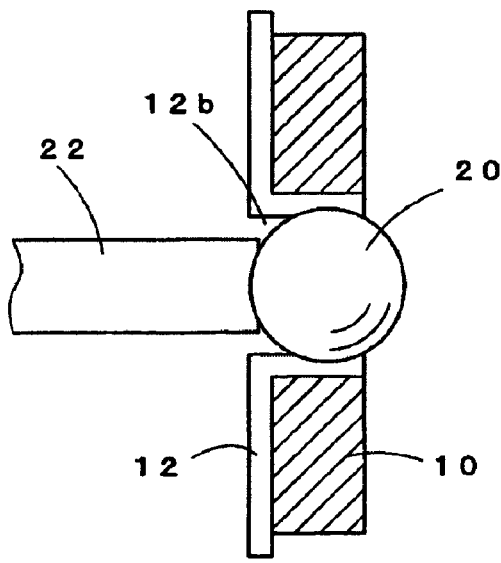
Figure 8:
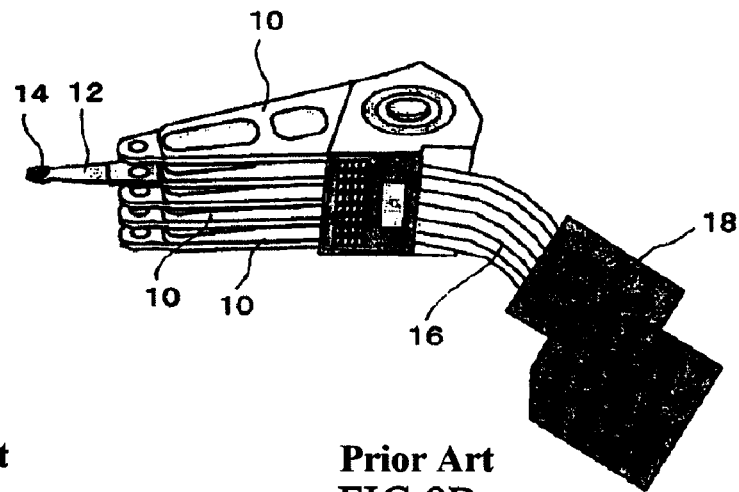
FIG. 8 is a diagram useful in explaining the overall construction of a carriage assembly.

FIGS. 7A and 7B show a method of crimping that causes thermal expansion of the ball 20 by heating the ball 20 using the crimping tool 22 when the suspensions 12 are crimped to the carriage arms 10 using the ball 20.

FIG. 7A shows a state where the crimping tool 22 is placed in contact with the ball 20 and the ball 20 is heated by the crimping tool 22, while FIG. 7B shows a state where the ball 20 has been heated and caused to thermally expand.

In this way, by using a method where the ball 20 is heated and crimping is carried out using thermal expansion of the ball 20, the stress caused by the ball 20 is concentrated at the crimped parts and therefore crimping can be carried out without deformation of the suspensions 12 or the like. Since the crimping tool 22 is a favorable conductor of heat, it is easy to transmit heat from the crimping tool 22 to the ball 20. Also, since a ball with an extremely small diameter of around 1 to 2 mm is used as the ball 20, by appropriately controlling the temperature of the crimping tool 22, it is possible to precisely control the temperature of the ball 20, and therefore the crimping force can be precisely controlled.

Note that it is possible to adjust the crimping force by controlling the temperature of the carriage arm 10 instead of controlling the temperature of the ball 20. That is, the crimping force becomes stronger when the carriage arm 10 is heated and the crimping force becomes weaker when the carriage arm 10 is cooled. In this way, it is also possible to control the crimping force by controlling the temperature of the support apparatus that supports the carriage arm 10.

Also, by controlling the temperature of the ball 20 to adjust the stress when the ball 20 passes through the crimping hole 12b, it is possible to achieve the required crimping force and assemble the carriage assembly without causing deformation of the suspension 12 and the like.

Although a plurality of embodiments have been described above, it is possible to carry out crimping by combining a plurality of the embodiments.

What is claimed is:

1. A method of assembling a carriage assembly, comprising the steps of:

setting a suspension on a carriage arm to align an attachment hole of the carriage arm and a crimping portion of the suspension; and pressing a ball through a crimping hole provided in the crimping portion so as to crimp the suspension to the carriage arm, wherein a concave portion or a convex portion is formed in the surface of the ball so as to crimp the suspension to the carriage arm.

2. A method of crimping together a first member and a second member, comprising the steps of:

aligning a crimping portion of the first member, which includes a crimping hole, and a hole of the second member;

positioning a ball, in whose surface a convex portion or a concave portion is formed, on the crimping hole; and pressing the ball into the crimping hole so as to crimp together the first member and the second member.

3. The method according to claim 2, wherein ultrasonic vibration is applied to the ball when the ball is pressed into the crimping hole provided in the first member.

* * * * *